United States Patent [19]

Lewis et al.

[11] Patent Number: 5,484,220
[45] Date of Patent: Jan. 16, 1996

[54] SWIVEL CONNECTOR

[75] Inventors: Charles T. Lewis, Bethany; Charles A. Lewis, Oklahoma City; Thomas J. Pogue, III; Sidney E. Pogue, both of Midwest City, all of Okla.

[73] Assignee: Lewis Manufacturing Company, Oklahoma City, Okla.

[21] Appl. No.: 109,292

[22] Filed: Aug. 19, 1993

[51] Int. Cl.$^6$ .................................. F16D 3/60; F16J 15/32
[52] U.S. Cl. .......................... 403/165; 403/164; 403/78; 277/29; 277/152
[58] Field of Search .......................... 403/165, 78, 60, 403/66, 164; 254/134.3 FT; 134.4; 277/88, 152, 178, 235, 29

[56]     References Cited

U.S. PATENT DOCUMENTS

| 2,003,934 | 6/1935 | Hansel | 277/187 |
|---|---|---|---|
| 2,195,997 | 4/1940 | Perkins | 403/165 |
| 2,318,119 | 5/1943 | Westhaver . | |
| 2,811,378 | 10/1957 | Kalista . | |
| 2,879,088 | 3/1959 | Peters . | |
| 2,918,335 | 12/1959 | Fruendt | 403/78 |
| 3,346,284 | 10/1967 | Petersen et al. . | |
| 3,490,799 | 1/1970 | Shreeve . | |
| 3,836,268 | 9/1974 | Behnke | 403/165 |
| 4,308,419 | 12/1981 | Fredriksson . | |
| 4,544,168 | 10/1985 | Hans et al. | 277/178 |
| 4,600,331 | 7/1986 | Gray . | |
| 4,669,907 | 6/1987 | Patton . | |
| 4,687,365 | 8/1987 | Promersberger . | |
| 4,723,804 | 2/1988 | Gatens . | |
| 4,798,481 | 1/1989 | Frank | 277/152 |

FOREIGN PATENT DOCUMENTS 1915343   10/1970   Germany ............................. 403/164

OTHER PUBLICATIONS

Prior art brochure published by Lewis Manufacturing Co., entitled "Quality Pulling Grips & Swivels".

*Primary Examiner*—Anthony Knight
*Attorney, Agent, or Firm*—Mary M. Lee

[57]     ABSTRACT

A self cleaning ball bearing swivel connector. The first swivel member is equipped with a seal engaging surface defined by a frusto-conical shoulder and a cylindrical neck. The end of the tubular body which contains the bearing assembly is adjacent to but spaced a distance from the shoulder and together with the shoulder and the neck defines a seal receiving space. A flanged seal is supported in the seal receiving space and the flange is adapted to serve as a one-way flap type valve, permitting debris inside the seal receiving space to be extruded by centrifugal force as the swivel connector rotates, yet preventing the entry of debris or surrounding liquids. The angled surface provided by the frusto-conical shoulder decreases the resistance to the centrifugal force propelling the debris out of the seal receiving space and, thus, facilitates the extrusion of debris.

13 Claims, 1 Drawing Sheet

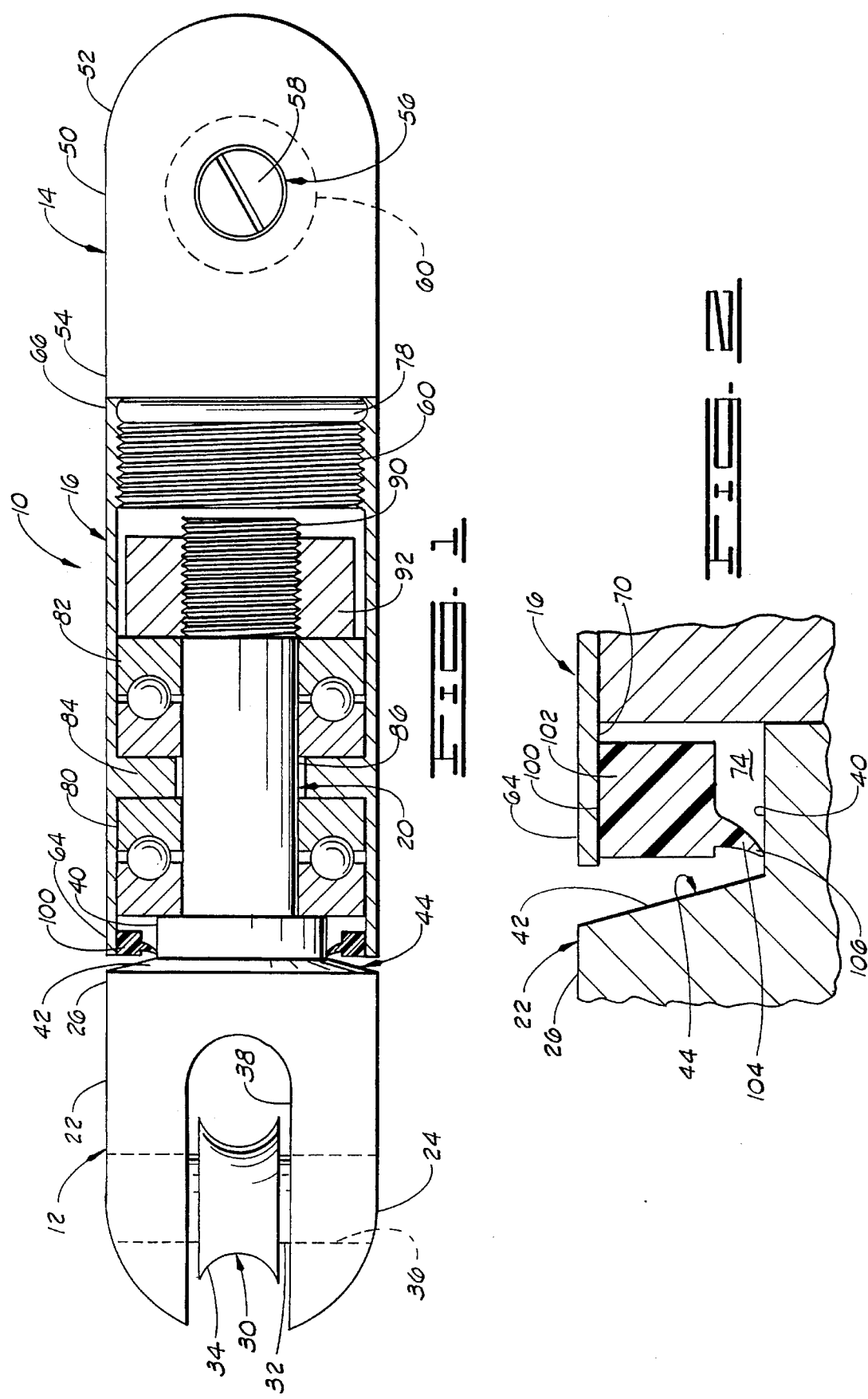

SWIVEL CONNECTOR

FIELD OF THE INVENTION

The present invention relates generally to swivel connectors.

SUMMARY OF THE INVENTION

The present invention is directed to a swivel connector. The swivel connector comprises a first swivel member with a head having a first end and a second end. The first end supports a connector assembly. A frusto-conical shoulder extends from the second end of the head, and a cylindrical neck extends from the shoulder to form with the shoulder seal engaging surface.

The swivel connector further comprises a second swivel member having a head with a first end and a second end. The first end supports a connector assembly. A tubular body having a first end and a second end is supported between the first and second swivel members so that the first end is adjacent to but spaced a distance from the shoulder of the first swivel member and so that the inner wall adjacent the end of the body is spaced a distance from the cylindrical neck of the first swivel member whereby the end and inner wall of the body and the shoulder and cylindrical neck of the first swivel member define an annular seal receiving space.

A swivel assembly is housed in the tubular body and adapted to connect the first and second swivel members for rotation relative to each other. A first seal is provided between the second end of the tubular body and the second end of the second swivel member, and seal is adapted to seal the joint therebetween. A second seal is provided inside the annular seal receiving space and comprises an annular body and a inner resilient flange. The outer aspect of the annular body is attached to the inner wall of the first end of the tubular body opposite the cylindrical neck. The flange terminates in a tip which extends to engage the seal engaging surface.

Further, the present invention comprises a swivel connector with a first swivel member with a head having a first end and a second end. The first end supports a connector assembly, and a cylindrical neck extends from the second end. The neck has a smaller diameter than the head so that the second end defines a shoulder which intersects the neck to form a seal engaging surface.

The swivel connector further comprises a second swivel member having a head with a first end and a second end. The first end supports a connector assembly. A tubular body having a first end and a second end is supported between the first and second swivel members so that the first end is adjacent to but spaced a distance from the shoulder of the first swivel member and so that the inner wall adjacent the end of the body is spaced a distance from the cylindrical neck of the first swivel member whereby the end and inner wall of the body together with the shoulder and cylindrical neck of the first swivel member define an annular seal receiving space.

A swivel assembly is housed in the tubular body and adapted to connect the first and second swivel members for rotation relative to each other. A first seal is provided between the second end of the tubular body and the second end of the second swivel member, and seal is adapted to seal the joint therebetween. A second seal is provided inside the annular seal receiving space and comprises an annular body and an inner resilient flange. The outer aspect of the annular body is attached to the inner wall of the first end of the tubular body opposite the cylindrical neck. The flange terminates in a tip which extends to engage the seal engaging surface.

Still further, the present invention includes a swivel connector comprising a first swivel member having a head with a first end and a second end. The first end supports a connector assembly, and a frusto-conical shoulder extends from the second end of the head. A cylindrical neck extends from the shoulder to form with the shoulder a seal engaging surface.

Also included is a second swivel member comprising a head having a first end and a second end. The first end supports a connector assembly.

A tubular body having a first end and a second end is supported between the first and second swivel members so that the first end is adjacent to but spaced a distance from the shoulder of the first swivel member and so that the inner wall adjacent the end is spaced a distance from the cylindrical neck of the first swivel member whereby the end and inner wall of the body and the shoulder and cylindrical neck of the first swivel member define an annular seal receiving space. A swivel assembly is housed in the tubular body and is adapted to connect the first and second swivel members for rotation relative to each other.

A first seal is provided between the second end of the tubular body and the second end of the second swivel member and is adapted to seal the joint therebetween. A second seal is provided inside the annular seal receiving space and is adapted to permit the extrusion of debris from the seal receiving space and to prevent the entry of debris and fluids into the seal receiving space.

BRIEF DESCRIPTION OF THE DRAWINGS

FIG. 1 is a side elevational view of a swivel connector constructed in accordance with the present invention. The outer wall of the body portion is cut away to display the internal components.

FIG. 2 is an enlarged, fragmented view in cross-section through the joint area including the flanged seal and slanted shoulder.

DETAILED DESCRIPTION OF THE PREFERRED EMBODIMENTS

Swivel connectors have many uses. For example, a ball bearing swivel connector such as that shown and described herein is ideal for directional boring procedures. Ball bearing swivel connectors, however, generate heat when rotated for prolonged periods at high speeds. For this reason, the swivel connectors are treated with a substance such as bentonite which serves as a coolant and a lubricant to prolong the life of the connector. However, bentonite tends to erode the bearings inside the connector.

A seal may be employed to prevent entry of the bentonite and other fluids and debris into the bearing assembly. However, where debris of some sort has found its way into the bearing, or has become lodged in the joint area between the body of the connector and the rotating end, a seal may prevent removal of the debris. The present invention provides an improved swivel connector which is self-cleaning for the removal of debris yet includes a seal to prevent entry of corrosive substances and debris.

With reference now to the drawings in general and to FIG. 1 in particular there is shown therein a swivel connector constructed in accordance with a preferred embodiment of the present invention and designated generally by the reference numeral 10. The swivel connector 10 comprises a first swivel member 12, a second swivel member 14 and a tubular body 16 supported therebetween which houses a swivel assembly 20.

The first swivel member 12 comprises a head 22 having a first end 24 and second end 26. The first end 24 supports a connector assembly 30. In the embodiment shown, the connector assembly 30 is a conventional toggle comprising a spindle 32 and spool 34. The spindle 32 is threadably mounted in a bore 36 which intersects a U-shaped space 38 which receives the spool 34.

Extending from the second end 26 of the head 22 is a cylindrical neck 40 which has a smaller diameter than the head 22. Thus, the second end 26 defines a shoulder 42 which intersects the neck 40 the shoulder 42 and the neck 40 cooperating to form a seal engaging surface 44 for a purpose yet to be described. Preferably, the shoulder 42 is frusto-conical so that it forms a slanted surface which in cross-section defines an obtuse angle, that is, an angle of greater than 90 degrees and less than 180 degrees relative to the neck 40.

With continuing reference to FIG. 1, the second swivel member 14 comprises a head 50 having a first end 52 and second end 54. Like the first end 24 of the head 22, the first end 52 of the head 50 supports a connector assembly 56 in the form of a toggle comprising a spindle 58 and a spool 60 (shown in phantom). Extending from the second end 54 of the head 50 is a threaded stem 60.

With reference now also to FIG. 2, the tubular body 16 has a first end 64 and a second end 66. As indicated previously, the tubular body 16 is supported between the first and second swivel members 12 and 14 and houses the swivel assembly 20. In the assembled connector 10, the first end 64 is adjacent to but spaced a distance from the shoulder 42 of the second end of the head 22 of the first swivel member 12. The inner wall 70 near the end 64 is spaced a distance from the cylindrical neck 40. Thus, the surfaces defined by the inner wall 70, the shoulder 42 and the neck 40 (the latter two forming the seal engaging surface 44) define an annular seal receiving space 74.

Returning to FIG. 1, the second end 66 of the tubular body 16 is threaded to engage the threaded stem 60 of the second swivel member 14. A seal such as an O-ring 78 is positioned at the joint between the body 16 and the second swivel member 14. The Oring preferably is selected to provide a seal which is impervious to liquids and particulate debris at least at atmospheric or near atmospheric pressure.

Referring still to FIG. 1, the swivel assembly 20 is housed in the tubular body 16 and is adapted to connect the first and second swivel members 12 and 14 for rotation relative to each other. In the preferred practice of this invention, the swivel assembly is a bearing assembly comprising a first bearing 80 and a second bearing 82 supported a distance apart inside the body 16 by a spacer ring 84. The bearings 80 and 82 are supported on a stem 86 which extends from the neck 40. The stem 86 has a smaller diameter than the neck 40 so that the neck serves to retain the bearing 80 between the neck and spacer ring 84. The free end 90 of the stem 86 is threaded to engage a locking nut 92 between the second bearing 82 and the threaded stem 60 of the second swivel member 14 so that the locking nut retains the second bearing 82 between the locking nut and the spacer ring 84.

Turning again to FIG. 2, a seal 100 is positioned in the annular seal receiving space 74. The seal 100 is adapted to permit the extrusion of liquids and debris from the seal receiving space and to prevent the entry thereinto of debris and fluids. A preferred seal 100 comprises an annular body 102 and an inner resilient flange 104. The preferred seal is integrally formed of steel reinforced neoprene so that the entire seal is somewhat resilient. The body 102 is pressed into place inside the first end 66 of the tubular body 16 and then sealed.

Although the flange 104 may take several shapes, it is preferably generally conical in cross-section so that the thickness gradually decreases terminating in the tip 106. The seal 100 and the flange 104 are sized so that the tip 106 of the flange will engage the seal engaging surface 44 by appressing the seal engaging surface and more preferably the neck 40 of the seal engaging surface, as illustrated in the drawings. As shown, the flange 104 extends at an angle from the body 102 toward the shoulder 42 and has a length such that the tip 106 will be spaced a distance from the seal engaging surface 44 when flexed slightly from centrifugal force. In this way, the flange 104 acts as a one-way flap valve for the seal receiving space 74. The angled flange 104 will offer minimal resistance to debris being extruded by centrifugal force as the first and second swivel members 12 and 14 are rotated rapidly. On the other hand, the angled flange 104 will provide substantial resistance to entry of such debris into the seal receiving space 74.

Now it will be appreciated the swivel connector of the present invention provides advantages not heretofore present in swivel connectors. The angled shoulder 42 provides a slanted surface which offers substantially less resistance to debris being extruded from the seal receiving space 74 by centrifugal force than would a strictly vertical shoulder surface (relative to the neck). The flanged seal acts as a one-way valve to seal the space 74 and the internal swivel assembly 20 from the intrusion of debris and corrosive substances.

Changes may be made in the combination and arrangement of the various parts, elements, steps and procedures described herein without departing from the spirit and scope of the invention as defined in the following claims.

What is claimed is:

1. A swivel connector comprising:

a first swivel member comprising:

a head having a first end and a second end, wherein the first end supports a connector assembly;

a frusto-conical shoulder extending from the second end of the head; and a cylindrical neck extending from the shoulder, the cylindrical neck cooperating with the shoulder to form a seal engaging surface;

a second swivel member comprising a head having a first end and a second end, wherein the first end supports a connector assembly;

a tubular body having a first end and a second end and supported between the first and second swivel members so that the first end of the tubular body is adjacent to but spaced a distance from the shoulder of the first swivel member and so that the inner wall of the tubular body adjacent the first end of the first swivel member is spaced a distance from the cylindrical neck of the first swivel member whereby the inner wall of the tubular body and the shoulder and the cylindrical neck of the first swivel member define an annular seal receiving space;

a swivel assembly housed in the tubular body and adapted to connect the first and second swivel members for rotation relative to each other, a portion of the swivel assembly being in communication with the seal receiving space;

a first seal adapted to seal the joint between the second end of the tubular body and the second end of the second swivel member; and a second seal inside the annular seal receiving space and comprising an annular body and an inner resilient flange, the outer aspect of the annular body being attached to the inner wall of the first end of the tubular body opposite the cylindrical neck and the flange terminating in a flexible tip which extends to engage the seal engaging surface to form therewith a one-way flap valve whereby extrusion of debris from the swivel assembly is permitted but entry of debris into the swivel assembly through the seal receiving space is substantially prevented.

2. The swivel connector of claim 1 wherein the flange of the second seal extends from the annular body, wherein the tip engages the cylindrical neck, and wherein the flange is angled toward the shoulder.

3. The swivel connector of claim 1 wherein the swivel assembly comprises a bearing assembly.

4. The swivel connector of claim 1 wherein the connector assemblies supported on the first and second swivel members are toggles.

5. A swivel connector comprising:
a first swivel member comprising:
a head having a first end and a second end, wherein the first end supports a connector assembly;
a cylindrical neck extending from the second end, the neck having a smaller diameter than the head so that the second end defines a shoulder which intersects the neck, the neck cooperating with the shoulder to form therewith a seal engaging surface;

a second swivel member comprising a head having a first end and a second end, wherein the first end supports a connector assembly;

a tubular body having a first end and a second end and supported between the first and second swivel members so that the first end of the tubular body is adjacent to but spaced a distance from the shoulder of the first swivel member and so that the inner wall adjacent the first end of the first swivel member is spaced a distance from the cylindrical neck of the first swivel member whereby the inner wall of the tubular body together with the shoulder and the cylindrical neck of the first swivel member define an annular seal receiving space;

a swivel assembly housed in the tubular body and adapted to connect the first and second swivel members for rotation relative to each other, a portion of the swivel assembly being in communication with the seal receiving space;

a first seal adapted to seal the joint between the second end of the tubular body and the second end of the second swivel member; and a second seal inside the annular seal receiving space and comprising an annular body and an inner resilient flange, the outer aspect of the annular body being attached to the inner wall of the first end of the tubular body opposite the cylindrical neck and the flange terminating in a flexible tip which extends to engage the seal engaging surface, to form therewith a one-way flap valve whereby extrusion of debris from the swivel assembly through the seal receiving space is permitted but entry of debris into the swivel assembly past the tip is substantially prevented.

6. The swivel connector of claim 5 wherein the flange of the second seal extends from the annular body, wherein the tip engages the cylindrical neck, and wherein the flange is angled toward the shoulder.

7. The swivel connector of claim 5 wherein the swivel assembly comprises a bearing assembly.

8. The swivel connector of claim 5 wherein the connector assemblies supported on the first and second swivel members are toggles.

9. A swivel connector comprising:
a first swivel member comprising:
a head having a first end and a second end, wherein the first end supports a connector assembly;
a frusto-conical shoulder extending from the second end of the head; and
a cylindrical neck extending from the shoulder, the cylindrical neck and the shoulder cooperating to form a seal engaging surface;

a second swivel member comprising a head having a first end and a second end, wherein the first end supports a connector assembly;

a tubular body having a first end and a second end and supported between the first and second swivel members so that the first end Of the tubular body is adjacent to but spaced a distance from the shoulder of the first swivel member and so that the inner wall adjacent the first end of the first swivel member is spaced a distance from the cylindrical neck of the first swivel member whereby the inner wall of the tubular body together with the shoulder and the cylindrical neck of the first swivel member define an annular seal receiving space;

a swivel assembly housed in the tubular body and adapted to connect the first and second swivel members for rotation relative to each other, a portion of the swivel assembly being in communication with the seal receiving space;

a first seal adapted to seal the joint between the second end of the tubular body and the second end of the second swivel member; and a second seal inside the annular seal receiving space and adapted to form a one-way flap valve whereby extrusion of debris from the swivel assembly through the seal receiving space is permitted but entry of debris and fluids into the swivel assembly through the seal receiving space past the seal is substantially prevented.

10. The swivel connector of claim 1 wherein the second seal is defined further as comprising an annular body portion and an inner resilient flange, the outer aspect of the annular body being attached to the inner wall of the first end of the tubular body opposite the cylindrical neck and the flange terminating in a tip which extends to engage the seal engaging surface.

11. The swivel connector of claim 10 wherein the flange of the second seal extends from the annular body, wherein the tip engages the cylindrical neck, and wherein the flange is angled toward the shoulder.

12. The swivel connector of claim 9 wherein the swivel assembly comprises a bearing assembly.

13. The swivel connector of claim 9 wherein the connector assemblies supported on the first and second swivel members are toggles.

* * * * *

UNITED STATES PATENT AND TRADEMARK OFFICE
CERTIFICATE OF CORRECTION

PATENT NO. : 5,484,220

DATED : January 16, 1996

INVENTOR(S) : Charles T. Lewis, Charles A. Lewis, Thomas J. Pogue, III and Sidney E. Pogue It is certified that error appears in the above-identified patent and that said Letters Patent is hereby corrected as shown below:

Column 3, line 49, should read -- o-ring --.

Column 6, claim 9, line 27, delete "Of" and insert -of-

Signed and Sealed this

Sixth Day of August, 1996

Attest:

BRUCE LEHMAN

Attesting Officer

Commissioner of Patents and Trademarks